June 5, 1945.                A. GIORDANO                2,377,548
VEGETABLE BELT FOR KETTLES
Filed June 11, 1943
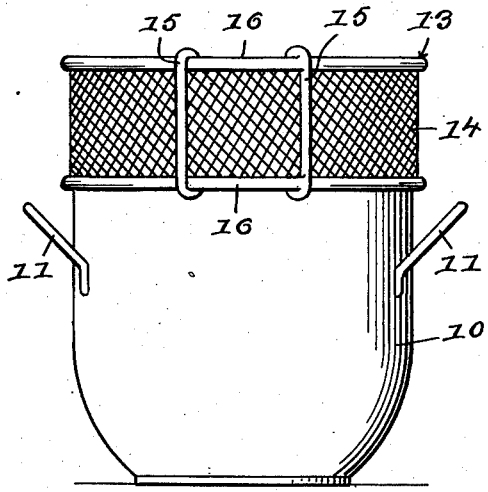
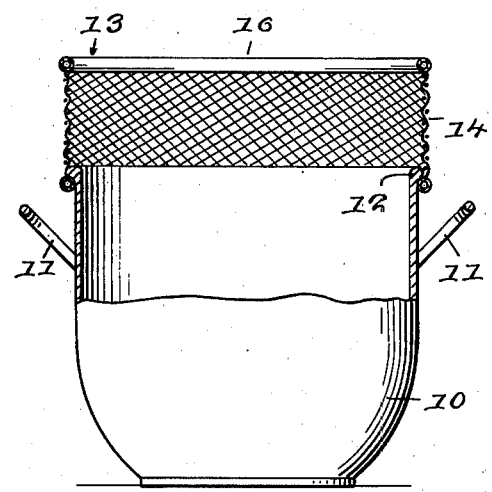
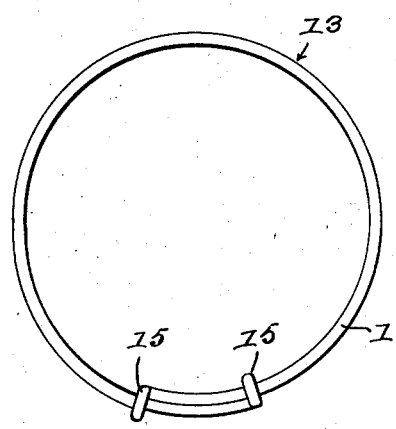
Antoinette Giordano
INVENTOR.
BY
*Victor J. Evans & Co.*
ATTORNEYS

UNITED STATES PATENT OFFICE 2,377,548

VEGETABLE BELT FOR KETTLES

Antoinette Giordano, Brooklyn, N. Y.

Application June 11, 1943, Serial No. 490,522

4 Claims. (Cl. 210—163.5)

This invention relates to a vegetable belt for kettles.

Since vegetables such as spinach, string beans, broccoli, kale and the like float on water, difficulty is experienced in washing the same since as the water overflows from the pot or kettle the vegetables go with it and drop into the sink.

With the above difficulty in mind the present invention provides an adjustable belt which may be applied to the top of pots of various sizes to form a continuation of the pot, the belt being formed of wire mesh to retain the vegetables while permitting the water to overflow from the pot. A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a front elevation of a pot equipped with a vegetable belt constructed in accordance with the invention.

Figure 2 is a front elevation of the pot with parts of the pot and the belt shown in section.

Figure 3 is a top plan view of the belt.

Figure 4 is a perspective view showing the manner of forming the frame with the loops.

Referring now to the drawing in which like characters of reference designate similar parts in the various views, 10 designates a pot having handles 11 and a rim 12. In carrying out the invention the vegetable belt for retaining the vegetables in the pot 10 while permitting the water to overflow is formed of an elongated rectangular frame 13, containing a wire mesh fabric 14, the frame being bent in the form of an annulus. Both ends of the frame are in the form of a closed elongated loop 15 adapted to slideably receive the sides of the frame so that the belt overlaps, see Figure 3, to adapt the belt to pots of various diameters.

In forming the frame it may be formed flat with the loops 15 open. The frame strands may then be turned to overlap and the loops 15 closed to complete the final form of an annulus.

The frame is formed of resilient material so as to constantly tend to contract in diameter. By virtue of the resiliency of the frame the lower side of the frame may be placed underneath the rim 12 of the pot and will tightly grip the pot at the rim so as to be prevented from accidental dislodgement.

The limit in enlarging the annulus is, of course, the point where the loops 15 engage each other. By reason of the inherent spring of the frame, however, it tends to normally take smaller diameters thereby tightening about the rim of a pot. In assuming smaller diameters the loops 15 slide on the frames.

The frame may be covered with rubber tubing 16 if desired. Also the mesh fabric is preferably formed of rust and corrosion resisting material.

In use the vegetables to be washed may be placed in the pot after the belt has been applied to the pot. Then the faucet may be turned on to fill the pot and kept on during the washing operation. The water will rise in the pot and float the vegetables into the vegetable belt where the vegetables will be retained during the washing operation while the water overflows from the pot into the sink.

From the above description it is thought that the construction and operation of the invention will be fully understood without further explanation.

What is claimed is:

1. A vegetable belt for pots comprising an elongated rectangular resilient frame, a wire mesh fabric in the frame, the frame being bent to form an annulus, a closed loop at each of the overlapping ends of the frame adapted to slideably receive the opposite end of the frame to change the diameter of the frame to receive various sizes of pots, said frame being adapted to be supported on top of a pot to form a continuation of the pot and retain vegetables while permitting water to overflow through the belt.

2. A vegetable belt for pots comprising an elongated rectangular resilient frame bent into circular form, a wire mesh fabric in the frame, both ends of the frame being bent to form closed loops slideably receiving the sides of the frame so that the frame is overlapped at one end to permit the diameter to be changed to fit various sizes of pots, the frame being adapted to be applied to the top of a pot and snugly fit the wall of the pot at the top to permit water flowing freely through the wire mesh fabric while vegetables are retained by the fabric.

3. The structure as of claim 1 and in which said frame is covered with rubber tubing.

4. A vegetable belt for pots comprising an annular reticulated member adapted to be detachably engaged with the top edge of a pot, and having a spring metal frame adapted to normally assume a smaller diameter than the greatest diameter possible to be assumed by the frame, the ends of the frame overlapping, and a closed loop on each end of the frame slidably receiving that portion of the opposed end of the frame next adjacent thereto.

ANTOINETTE GIORDANO.